Jan. 25, 1944.  M. P. TRIBUNO  2,340,235
PROCESS OF ROASTING COFFEE
Filed Feb. 5, 1942
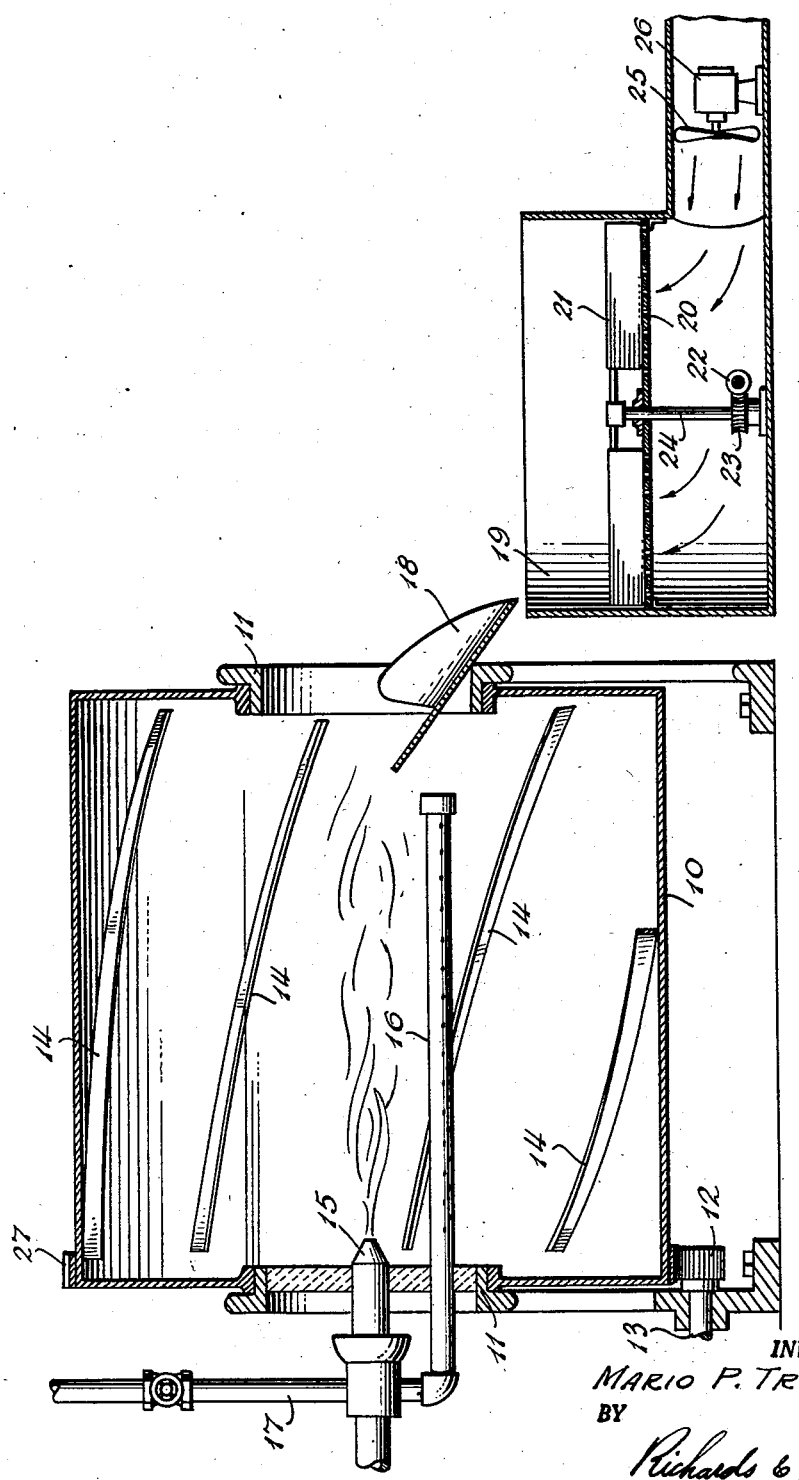
INVENTOR.
MARIO P. TRIBUNO
BY
Richards & Geier
ATTORNEYS Patented Jan. 25, 1944

2,340,235

UNITED STATES PATENT OFFICE 2,340,235

PROCESS OF ROASTING COFFEE

Mario P. Tribuno, Bayside, Long Island, N. Y.

Application February 5, 1942, Serial No. 429,612

2 Claims. (Cl. 99—167)

This invention relates to an improved process of roasting coffee.

One of the principal objects is to provide a method which will preserve the coffee in fresh condition without special packaging.

Another object is to enhance the flavor and aroma of the coffee.

Still another object is to reduce the shrinkage in weight which results from the coffee-roasting process.

It is thought advisable to including the following explanatory matter for a better understanding of the invention.

Immediately after the roasting, the aromatic flavor which is extracted in brewing and which is the characteristic of coffee, for which the consumer principally buys it, starts to decrease in strength. After keeping ground coffee in a bag, can or jar for about two or three weeks, it is necessary to use twice as much coffee in order to obtain the same flavor strength of the brew as was required immediately after the roasting process. This loss in flavor strength not only increases the cost, but, also, much of the caffein gets into the brew because the caffein content does not decrease with age. Thus, coffee which has decreased in freshness is not only less desirable from a flavor point of view, but it also becomes increasingly undesirable from a health standpoint as it grows older. Such coffee has the effect of intensifying nervousness and insomnia in the users.

In addition, coffee which has become aged in this manner has a more bitter flavor on account of the greater proportion of extractives which get into the brew.

Tests have shown that, after the eleventh or twelfth day after roasting, a rancid taste, due to staleness, becomes noticeable. This stale flavor increases rapidly thereafter and soon makes the beverage unpalatable.

Thus, freshness in coffee means more than mere absence of staleness and, contrariwise, staleness is more than just lack of freshness; it is lack of freshness plus an added unpleasant flavor. Loss of freshness begins long before the stale flavor comes into the picture, and the loss of freshness means, chiefly, a loss of strength and, hence, loss of economy in use. As the coffee loses its freshness, there is an additional loss in the quality of flavor because of the extra bitterness occasioned by the necessity of steeping a larger quantity of coffee to get the brew of the same flavor strength.

The foregoing remarks have been directed principally to unground, roasted coffee. It is obvious that deterioration will become much more rapid after the coffee has been ground, because of the exposure to air of the inner particles of the coffee bean.

In order to prevent, in some measure, the deterioration, many packers have resorted to vacuum-packing. Tests have shown, however, that vacuum-packed coffee shows the same rapid loss of freshness and strength during the first few days. This is due to the fact that the volatiles, which give to the coffee the aroma, escape even easier than normally when the restraint of atmospheric pressure has been removed. The vacuum-pack's advantage in the preservation of coffee does not amount to much until well into the second week, after which the average loss of freshness takes place at about one-third the rate which applies to coffee as sealed in tight containers in air on the same date. The lower rate of loss with time in vacuum-packed coffee is due to gradual building up of gas pressure in the can. However, as the coffee ages within the vacuum-sealed can, considerable pressure is built up by the aromatic gas which escapes from the coffee-beans. Thus, when the can is opened, the gas passes out into the air and the coffee loses its flavor strength in one puff instead of gradually.

It is, therefore, the purpose of the present invention to preserve the coffee-bean in fresh condition by protecting it against exposure to the air and preventing the evaporation of the volatile constituents.

In terms of broad inclusion, the invention contemplates the making of a separate vacuum-sealed container for the aromatic volatiles of each bean. This object may be accomplished by impregnating the coffee-bean with glycerinated sugar in the manner hereinafter described.

Referring to the drawing:

Figure 1 is a cross-sectional view of a coffee roaster.

Figure 2 is a cross-sectional view of a cooling apparatus.

According to the conventional practice, the coffee-beans are loaded into the rotatable drum 10 which is revolved about the hubs 11 by means of the pinion 12 which is connected to the driving source by means of the driveshaft 13. The interior of the drum is provided with a number of vanes 14 which agitate the coffee within the drum as the latter is rotated.

The heat for the roasting of the coffee is applied by the gas-burner or similar burner 15. A perforated pipe 16 also extends into the drum 10 which is connected to a suitable reservoir by means of the conduit pipe 17.

An opening in one of the hubs 11 is provided for the purpose of removing the roasted coffee after the completion of the roasting process. The funnel 18 is inserted into the opening and the roasted coffee-beans will be dumped into the hopper 19 of the cooling apparatus. The hopper 19 is provided with a perforated floor 20, across which rotate a pair of agitator vanes 21. The agitator vanes are rotated by means of the gears 22 and 23 in the shaft 24. A blower fan 25, which is actuated by the motor 26, serves to cause a current of air to be blown through the perforations of the floor 20 upwardly through the coffee beans when the latter are deposited in the hopper.

After the roasting process has been completed, which usually takes from fourteen to twenty minutes, the flame is extinguished and all the openings in the roasting drum are closed, with the exception of the air vent 27. The hot, roasted coffee-beans, while still being agitated by the vanes 14, are sprayed with a cold, glycerinated sugar solution through the perforated pipe 16.

The sprayed, roasted coffee should be kept rotating for one-half minute. During this time the water in the mixture is evaporated and the steam is expelled through the air vent 27.

The partial vacuum created in the coffee beans during the roasting process will have the effect of drawing the sugar into the crevices and pores and effectively sealing the same against escape of the aromatic volatiles, whereas the water will be immediately evaporated and expelled in the form of steam. By reason of the fact that the volatile essences within the coffee-bean are absorbed by the glycerinated sugar, the coffee treated according to the instant invention will have a much richer flavor than conventionally roasted coffee.

After this treatment, the coffee-beans are emptied into the cooler. In the conventional cooler, the coffee-beans are cooled by an extraction fan drawing air through the beans and the perforated floor. According to the instant process, however, the cool air should be blown slowly from below the perforated floor. In this manner the hot, roasted coffee is cooled slowly without extraction of any of the glycerinated sugar which has been deposited in the crevices and pores of the coffee-beans and which still is in non-crystalline form. After the cooling process has been completed, the glycerinated sugar will harden and become firmly deposited in the pores and crevices.

It will also be understood that by reason of the deposit of the glycerinated sugar solution in the pores and crevices of the coffee-beans, loss of volatiles will be prevented during the cooling operation. According to the conventional process, considerable loss of aromatic flavor takes place during the cooling operation because of the exposed character of the beans. In this conventional process, part of the flavor or aroma is absorbed and expelled with the cooling air.

For treating one pound of green coffee, a solution having the following composition is preferably used:

Warm water _____ cubic centimeters__ 16
Sugar _____ grams__ 16
Glycerin _____ cubic centimeters__ 2

The solution, after having been thoroughly mixed, should be cooled to 50 to 60° F. before it is sprayed on the roasted coffee. The quantity of water, sugar and glycerin may be altered slightly, depending upon the quality, origin, age and dryness of the green coffee-beans.

During the roasting process, the coffee-beans increase to over twice their size and lose from 14 to 20% of their weight. The resultant effect is innumerable crevices and cavities which become filled with air.

Tests have shown that in coffee treated according to the invention, the shrinkage in weight has been reduced from 9 to 13%, depending upon the grade and quality of the coffee.

It is conceded that several other methods have been used for the purpose of preserving and protecting the coffee-beans and which processes include the treatment with a sugar solution. However, according to these old processes, the green or raw beans are soaked in a sugar solution either prior to the roasting process or else during the cooling process. In the former case, the sugar becomes caramelized within the bean and thus gives the coffee a foreign taste. In the latter case, it causes a coating on the surface of the beans. It will be understood that these processes have no connection with the instant invention, which contemplates the impregnation of the coffee beans with a glycerinated sugar solution and the sealing of the crevices and pores created by the roasting process against escape of the aromatic volatiles.

What is claimed is:

1. A process for treating coffee-beans, which consists in roasting the coffee to the final degree, then immediately bringing the coffee-beans at roasting temperature and within the roasting chamber into contact with a cold glycerinated sugar solution whereby the partial vacuum created in the hot beans will absorb the glycerinated sugar to fill the pores and crevices of the beans together with simultaneous and quick evaporation of the water, and then cooling said coffee-beans.

2. A process for treating coffee-beans, which consists in roasting the coffee to the final degree, then immediately bringing the coffee-beans at roasting temperature and within the roasting chamber into contact with a cold glycerinated sugar solution whereby the partial vacuum created in the hot beans will absorb the glycerinated sugar to fill the pores and crevices of the beans together with simultaneous and quick evaporation of the water and then cooling said coffee-beans by blowing, gently, a current of air thereover, whereby the glycerinated sugar will crystallize within the pores and crevices and effectively seal the coffee beans against the escape of aromatic essences.

MARIO P. TRIBUNO.